US 6,191,892 B1

(12) United States Patent
Isaka et al.

(10) Patent No.: US 6,191,892 B1
(45) Date of Patent: *Feb. 20, 2001

(54) IMAGE DISPLAY APPARATUS

(75) Inventors: Kazuo Isaka, Tokyo; Shoichi Yamazaki, Yokohama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/827,466

(22) Filed: Mar. 28, 1997

(30) Foreign Application Priority Data

Apr. 2, 1996 (JP) .................................................. 8-104577

(51) Int. Cl.⁷ ............................. G02B 27/14; G09G 05/00
(52) U.S. Cl. ............................................................ 359/630
(58) Field of Search ............................... 359/618, 630, 359/631, 633, 637; 345/7, 8

(56) References Cited

U.S. PATENT DOCUMENTS

| Re. 27,356 | 5/1972 | La Russa | 350/157 |
|---|---|---|---|
| 4,026,641 | 5/1977 | Bosserman et al. | 350/298 |
| 4,081,209 | 3/1978 | Heller et al. | 350/174 |
| 4,563,061 | 1/1986 | Ellis | 350/503 |
| 4,669,810 | 6/1987 | Wood | 350/3.7 |
| 4,775,217 | 10/1988 | Ellis | 350/538 |
| 4,852,988 * | 8/1989 | Velez et al. | 351/210 |
| 4,874,214 | 10/1989 | Cheysson et al. | 350/3.7 |
| 4,969,724 | 11/1990 | Ellis | 350/503 |
| 5,006,072 | 4/1991 | Letovsky et al. | 434/61 |
| 5,093,567 * | 3/1992 | Staveley | 250/221 |
| 5,124,839 | 6/1992 | Yamazaki et al. | 359/454 |
| 5,189,454 | 2/1993 | Yamazaki et al. | 354/200 |
| 5,384,654 | 1/1995 | Iba | 359/364 |
| 5,416,876 | 5/1995 | Ansley et al. | 385/116 |
| 5,436,763 | 7/1995 | Chen et al. | 359/565 |
| 5,436,765 | 7/1995 | Togino | 359/631 |
| 5,459,612 | 10/1995 | Ingleton | 359/630 |
| 5,479,224 | 12/1995 | Yasugaki et al. | 353/101 |
| 5,483,307 | 1/1996 | Anderson | 353/98 |
| 5,486,841 | 1/1996 | Hara et al. | 345/8 |
| 5,513,041 | 4/1996 | Togino | 359/631 |
| 5,594,588 | 1/1997 | Togino | 359/631 |
| 5,689,736 * | 2/1996 | Okuyama et al. | 396/51 |
| 5,701,202 | 12/1997 | Takahashi | 359/631 |
| 5,717,413 * | 2/1998 | Mizouchi | 345/7 |

FOREIGN PATENT DOCUMENTS

| 0 380 035 | 8/1990 | (EP) . |
|---|---|---|
| 0 408 344 | 1/1991 | (EP) . |
| 0 556 598 | 8/1993 | (EP) . |
| 0 583 116 | 2/1994 | (EP) . |
| 0 618 471 | 10/1994 | (EP) . |
| 1578136 | 11/1980 | (GB) . |
| 2246900 | 2/1992 | (GB) . |
| 58-78116 | 5/1983 | (JP) . |

(List continued on next page.)

*Primary Examiner*—Georgia Epps
*Assistant Examiner*—Ricky Mack
(74) *Attorney, Agent, or Firm*—Fitzpatrick, Cella, Harper & Scinto

(57) ABSTRACT

This specification discloses an image display apparatus of the see-through type having display means for displaying an image on a display surface, an image observation optical system for re-imaging the image forwardly of an observer, an exterior scene observation optical system for observing therethrough an exterior scene forward of the observer, visual axis detecting means for detecting the visual axis directions of the observer's both eyes, and control means for detecting the gaze distance of the both eyes on the basis of the visual axis directions of the observer's both eyes detected by the visual axis detecting means, and controlling the re-imaged position of the image on the basis of the gaze distance.

10 Claims, 11 Drawing Sheets

FOREIGN PATENT DOCUMENTS

| | | |
|---|---|---|
| 62-214782 | 9/1987 | (JP) . |
| 1-274736 | 11/1989 | (JP) . |
| 2-297516 | 12/1990 | (JP) . |
| 3-101709 | 4/1991 | (JP) . |
| 3-109029 | 5/1991 | (JP) . |
| 4-242630 | 8/1992 | (JP) . |
| 5-303056 | 11/1993 | (JP) . |

* cited by examiner

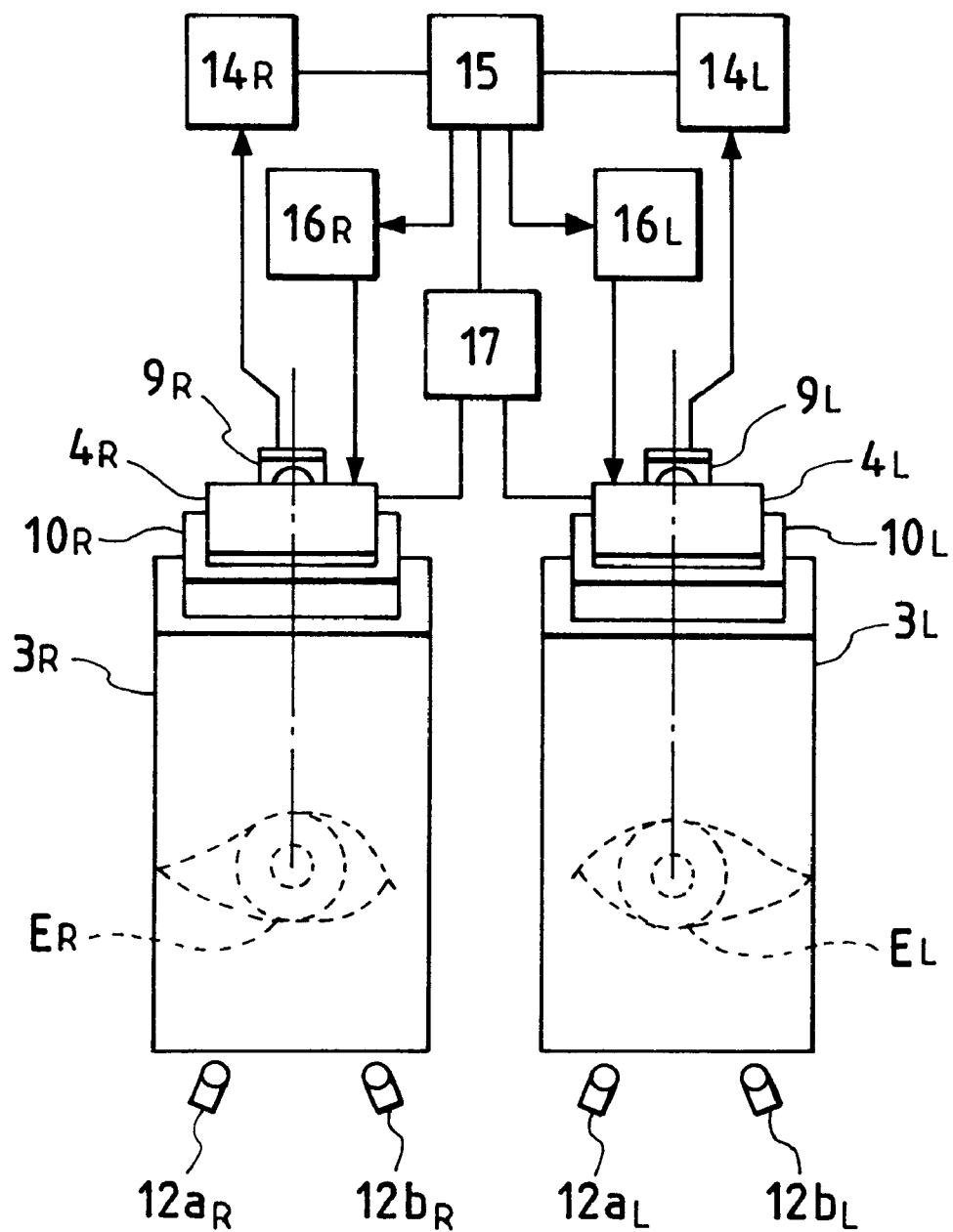

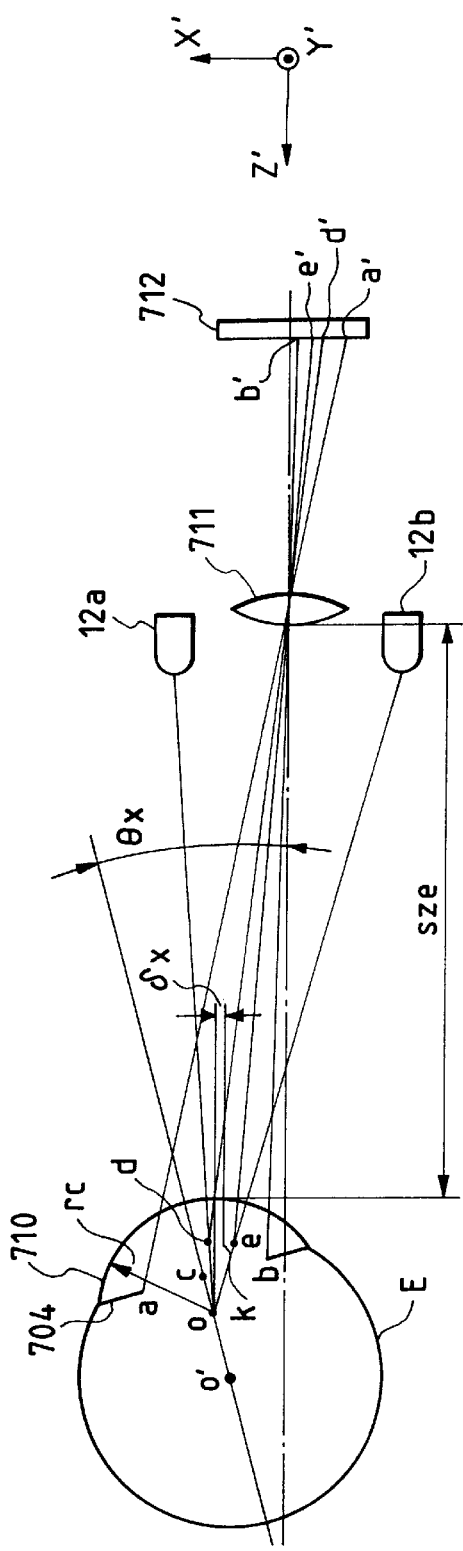
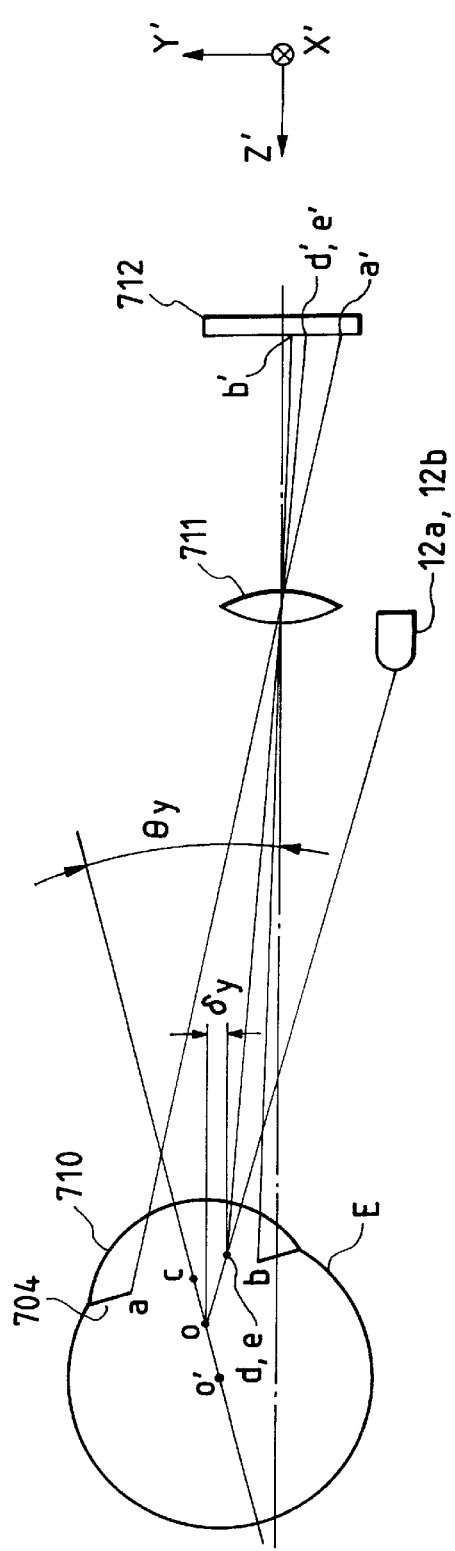
FIG. 5A
FIG. 5B $$Z = \frac{D}{\tan\theta_{x,R} - \tan\theta_{x,L}}$$

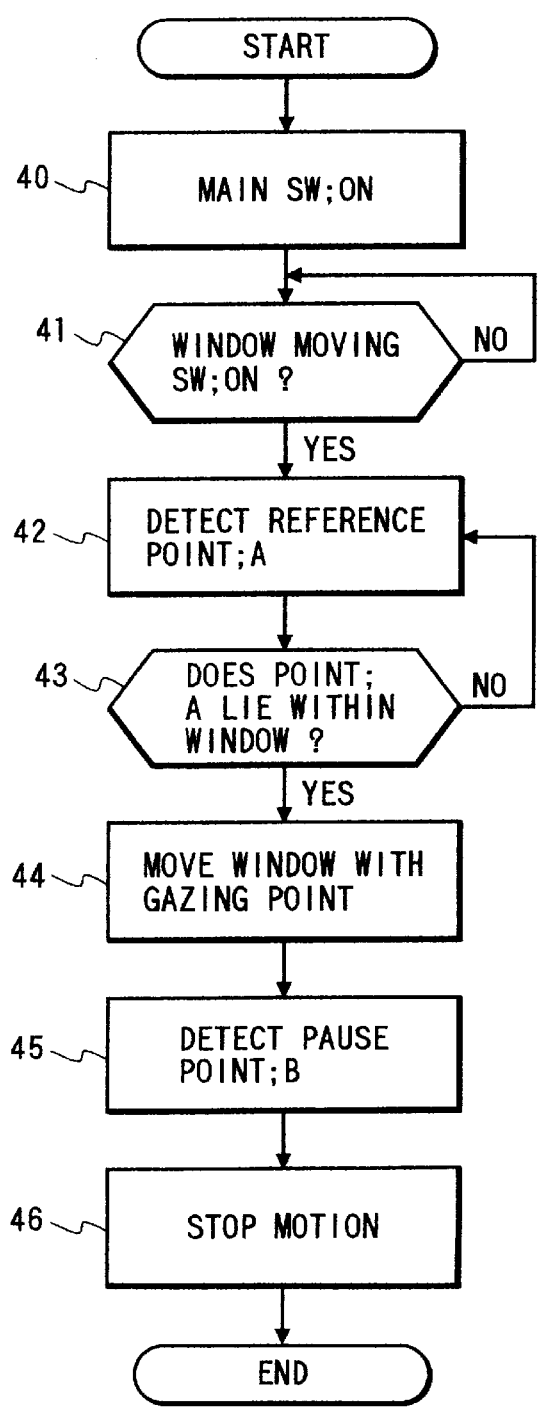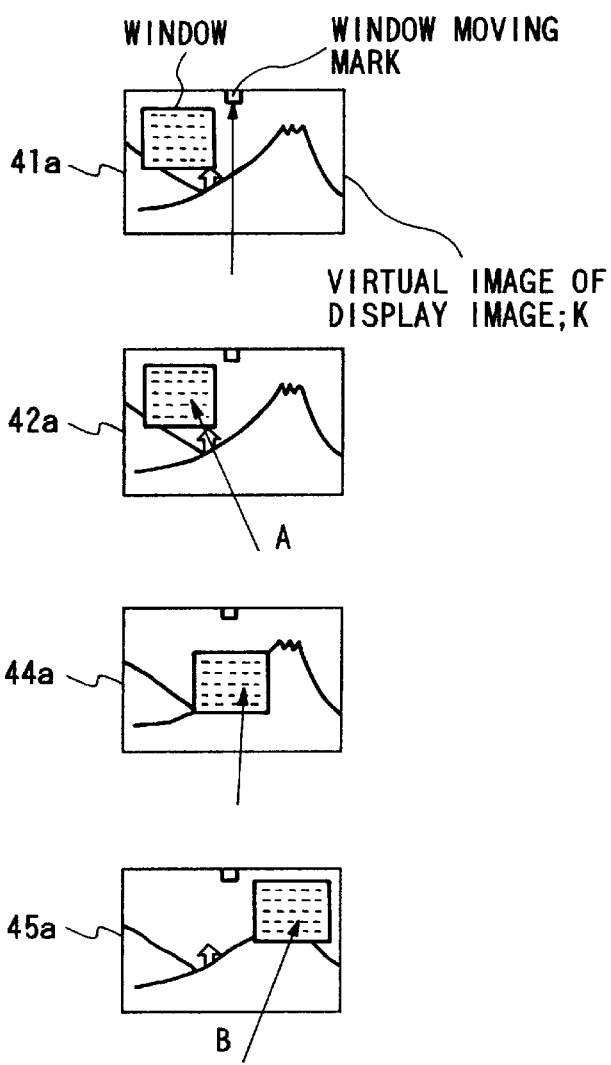

IMAGE DISPLAY APPARATUS

BACKGROUND OF THE INVENTION

1. Field of the Invention

This invention relates to an image display apparatus, and particularly to a head mounted type display apparatus or a spectacle type display apparatus which enables an image such as characters or a projected image displayed on display means to be observed as an enlarged virtual image.

2. Related Background Art

With the development of the liquid crystal display element, a head mounted display (HMD) of the so-called see-through type, in which a liquid crystal display element and an observation optical system are provided in front of an observer's eyes, and the observer observes an exterior scene through the optical system and an image is displayed on the liquid crystal display element and simultaneously shown with another image superposed on the exterior scene.

There is also known an image display apparatus in which an image displayed on a display element is changed over according to an observer's visual axis.

The conventional HMD type image display apparatus has attached thereto a mechanism for adjusting the visibility of the optical system relative to the display element, but has suffered from the problem that when the distance of an exterior scene observed by an observer greatly fluctuates, for example, from infinity to several tens of centimeters in front of the observer's eyes, the distance of the virtual image of an image displayed while being superposed on the exterior scene is greatly in discord with the observation distance and a blurred virtual image is visually confirmed.

Also, sometimes the image superposed is not necessary in the whole observation distance and for example, in an observation distance within 2 m, image information is required and in the other observation distances, the image information is not required or becomes harmful.

Also, in an image display apparatus wherein the display image is changed over by the visual axis, it is often the case that the display image is not changed over to an entirely discrete image, but it is desired to move the image being displayed and change over it so as to represent a new portion, whereas the image display apparatus according to the conventional art could not accomplish such a thing.

SUMMARY OF THE INVENTION

The present invention has as its object to provide an image display apparatus which is good in operability.

The image display apparatus of the present invention is:
(1-1) An image display apparatus of the see-through type having display means for displaying an image for an observer, an exterior scene observation optical system for observing therethrough an exterior scene forward of the observer, visual axis detecting means for detecting the visual axis directions of the observer's both eyes, and control means for detecting the gaze distance of the two eyes on the basis of the visual axis directions of the observer's both eyes detected by the visual axis detecting means, and controlling the condition of the image on the basis of the gaze distance. Particularly, it is characterized in that
(1-1-1) the control means moves a display surface of the display means or moves a portion of an image observation optical system of the display means or electrically controls a portion of the display means on the basis of the gaze distance and forms the image of the image at the gaze distance;
(1-1-2) the control means displays the image by the display means when the gaze distance is within a predetermined distance range, and does not display the image of the display means when the gaze distance is outside the distance range,
or displays a portion of the image by the display means when the gaze distance is within a predetermined distance range, and does not display a portion of the image when the gaze distance is outside the distance range,
or displays an image by the display means when the gaze distance is within a predetermined distance range, and displays an image differing from the image when the gaze distance is outside the distance range; and
(1-1-3) the display means is provided correspondingly to the observer's both eyes, respectively.

Other several image display apparatuses of the present invention are:
(1-2) an image display apparatus having image displaying means for displaying an image for an observer, visual axis detecting means for detecting the visual axis direction of an eye, and control means for detecting a point in the image at which the observer next gazes for a predetermined time or longer when it is detected through the visual axis detecting means that the observer has gazed at a certain mark in the image for a predetermined time or longer, and moving the point in the image with the visual axis;
(1-3) an image display apparatus having image displaying means for displaying an image for an observer, visual axis detecting means for detecting the visual axis direction of an eye, and control means for detecting a point A at which the observer gazes in the image for a predetermined time or longer when it is detected through the visual axis detecting means that the observer has gazed at a mark in the image for a predetermined time or longer, and detecting a point C at which the observer next gazes in the image for a predetermined time or longer, and moving the point A in the image to the point C or moving the point C to the point A;
(1-4) an image display apparatus having image displaying means for displaying an image for an observer, visual axis detecting means for detecting the visual axis direction of an eye, and control means for detecting a point A at which the observer gazes in a window in the image for a predetermined time or longer when it is detected through the visual axis detecting means that the observer has gazed at a mark in the image for a predetermined time or longer, and moving the image of the window with the visual axis; and
(1-5) an image display apparatus having image displaying means for forming an image for an observer, visual axis detecting means for detecting the visual axis direction of an eye, and control means for moving the image at a predetermined speed in a direction corresponding to a certain mark in the image and displaying it when it is detected through the visual axis detecting means that the observer has gazed at the mark for a predetermined time or longer, and detecting that the observer's visual axis has deviated from the mark, and stopping the movement of the image.

BRIEF DESCRIPTION OF THE DRAWINGS

FIG. 2 is a schematic view (front view) of the essential portions of Embodiment 1 of the present invention.

FIGS. 5A and 5B are illustrations of a visual axis detecting method.

FIGS. 11A and 11B are flow charts of Embodiment 5 of the present invention.

DESCRIPTION OF THE PREFERRED EMBODIMENTS

Figure 1A:
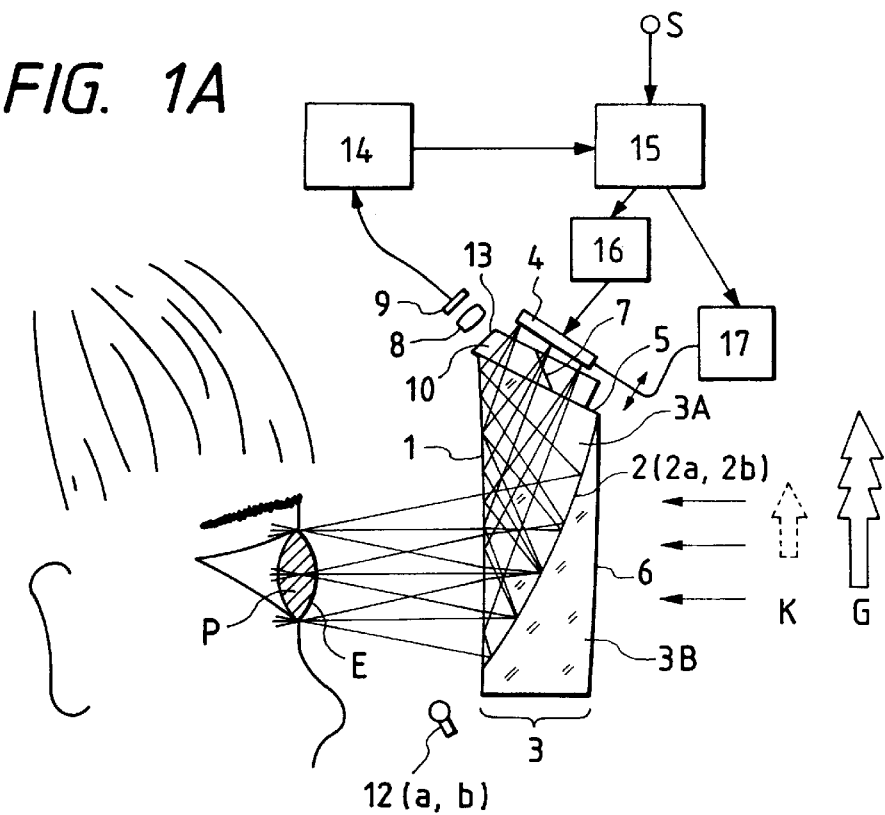
FIGS. 1A and 1B are schematic views of the essential portions of Embodiment 1 of the present invention, FIG. 1A being an illustration of an image observation optical system and an exterior scene observation optical system, and FIG. 1B being an illustration of visual axis detecting means.
Figure 1B:
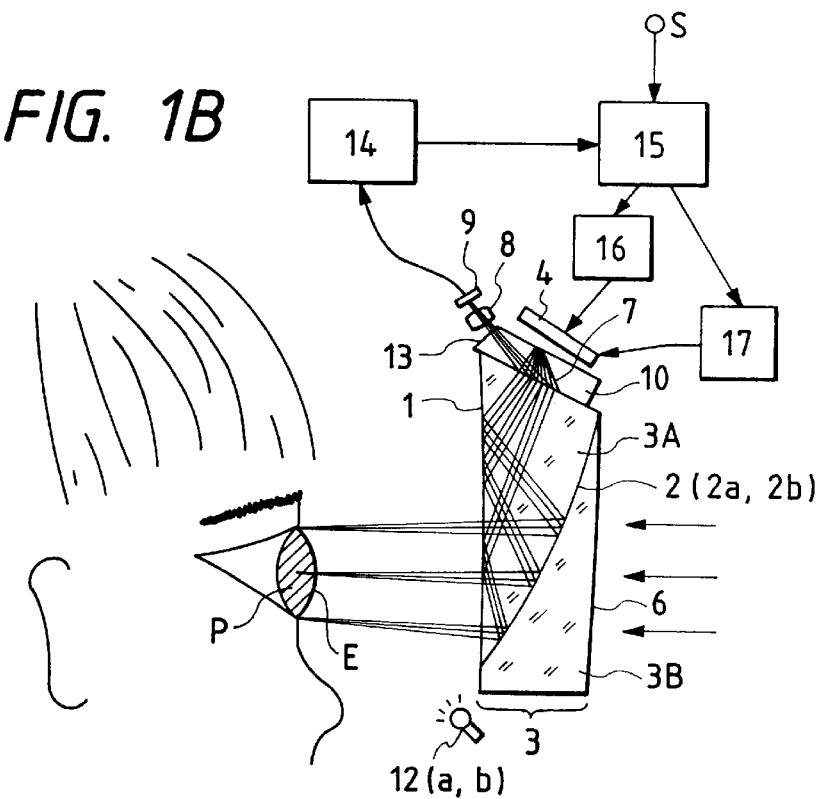

FIGS. 1A, 1B and 2 are schematic views of the essential portions of Embodiment 1 of the present invention. FIGS. 1A and 1B are vertical cross-sectional views of an optical system, FIG. 1A illustrating the image observation optical system and exterior scene observation optical system of Embodiment 1, and FIG. 1B illustrating the visual axis detecting means of Embodiment 1, and both of these figures depicts an optical path therein. FIG. 2 is a front view of Embodiment 1. In these figures, it is to be understood that an observer places his both eyes on horizontal lines and is looking at the horizontal lines without inclining his head.

As shown in FIG. 2, in the present embodiment, optical systems and visual axis detecting means of the same construction are provided for the right eye $E_R$ and the left eye $E_L$, respectively. The lower letters R and L attached to each element shown indicate that the element is the element of an optical system for the right eye and the element is the element of an optical system for the left eye, respectively FIGS. 1A and 1B show the optical system for the right eye, but for the simplicity of illustration, the lower letter R indicating the element for the right eye is omitted. In FIGS. 1A and 1B the reference numeral 4 designates display means, on the display surface of which an image such as characters or a picture is displayed with light in the visible range. The reference numeral 10 denotes a flat plate-like prism comprising two prisms joined together, and on the joint surface 7 thereof, there is installed a dichroic mirror transmitting visible light therethrough and reflecting infrared light for visual axis detection. The reference numeral 13 designates the side end surface of the prism 10.

The reference character 3A denotes a first optical member. The first optical member 3A has a surface 5 comprising a flat surface, a surface 1 utilizing total reflection in a portion comprising a flat surface or an aspherical surface, and a convex surface 2a comprising a half-transmitting spherical surface or aspherical surface. The reference character 3B designates a second optical member. The second optical member 3B has a surface 6 having a transparent flat surface or a curvature, and a concave surface 2b of the same shape as the convex surface 2a and comprising a half-transmitting spherical surface or aspherical surface. The surface 2a of the first optical member 3A and the surface 2b of the second optical member 3B are joined together to thereby constitute a prism block 3 as a whole.

The reference numeral 8 denotes an imaging lens for visual axis detection, the reference numeral 9 designates an image pickup element comprising a CCD, and the reference characters 12a and 12b denote infrared light sources for detecting the visual axis of the observer's eyeball E, and the infrared light sources 12a and 12b emit infrared light which is non-visible light and irradiate the front eye part of the observer's eyeball E.

The reference numeral 14 designates a visual axis detection circuit for detecting the visual axis direction of the observer's one eyeball E. The reference numeral 15 denotes control means for receiving an image signal from an image information source S and outputting it to an image display circuit 16. Also, the control means 15 calculates a distance over which the observer is gazing from the visual axis information of the both eyes from the visual axis detection circuits $14_R$ and $14_L$, drives a display means moving mechanism 17 on the basis thereof, drives the display means 4, moves the virtual image of an image displayed on the display means back and forth relative to the eye, and forms this virtual image at the position of the distance at which the observer is gazing.

The image display circuit 16 displays an image on the display surface of the display means 4 on the basis of an image signal from the control means 15.

Each of the prism 10, the first optical member 3A, etc. constitutes an element of the image observation optical system. The prism block 3 constitutes an element of the exterior scene observation optical system.

Each of the infrared light sources 12a, 12b, the first optical member 3A, the prism 10, the imaging lens 8, the image pickup element 9 and the visual axis detection circuit 14, etc. constitutes an element of the visual axis detecting means.

The action of the present embodiment will now be described. The action of the image observation optical system will first be described with reference to FIG. 1A. The control means 15 displays an image on the display surface of the display means 4 through the image display circuit 16 on the basis of a signal from the image information source S. A light beam (visible light beam) from this image is transmitted through the prism 10, enters the first optical member 3A from the surface 5, is totally reflected by the surface 1, is reflected and converged by the half mirror surface 2, and then emerges from the surface 1 and enters the observer's pupil P. The virtual image K of the image displayed on the display means 4 is formed forwardly of the observer, who can visually confirm this virtual image K.

The action of the exterior scene observation optical system will now be described. A light beam from the scene of the external world (the exterior scene) G enters the surface 6 of the prism block 3, is transmitted through the half mirror surface 2, emerges from the surface 1 and arrives at the observer's pupil P, and the observer observes this light beam as the image of the external world. The observer visually confirms the virtual image K of the image displayed on the display means 4 as an image spatially superposed in the exterior scene G in the same field of view.

Description will now be made of the action of the present embodiment detecting the gaze distance of the both eyes and forming the virtual image K there. First, for the right and left eyes are detected the visual axis directions of the respective eyes by the respective visual axis detecting means. In FIG. 1B, the reflected and scattered light from the front eye part of the observer's eye E illuminated by the non-visible light (infrared light) of the infrared light sources 12a and 12b enters the surface 1 of the first optical member 3A, is reflected by the half mirror surface 2, travels toward the surface 1, is totally reflected by the surface 1, emerges from the surface 5 and enters the prism 10. The light is then reflected by the joint surface 7, and is totally reflected by the lower surface of the prism 10, whereafter it emerges from the surface 13. The light then passes through the imaging lens 8 and forms the image of the front eye part on the image pickup element 9.

Figure 3:
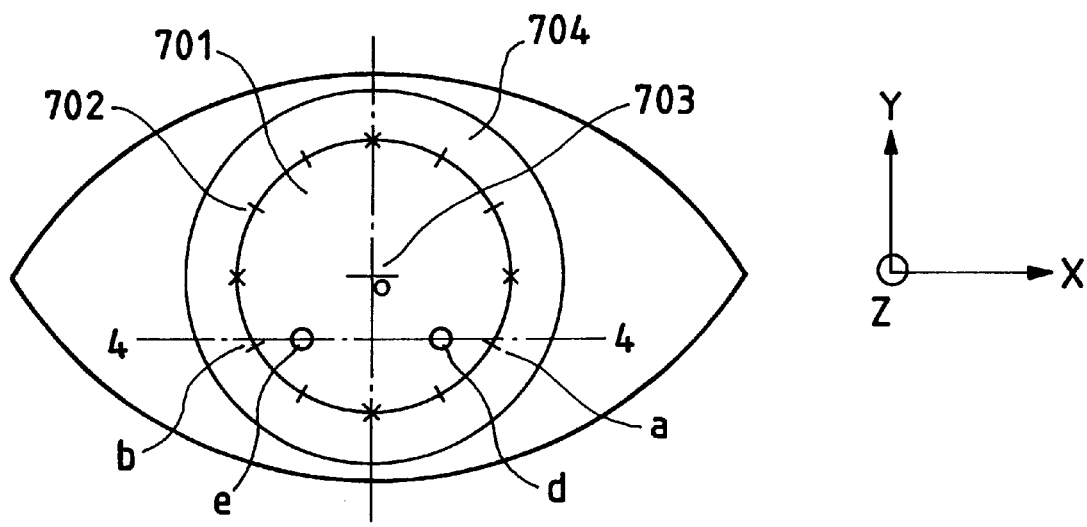
FIG. 3 is a schematic view of the image of an eyeball obtained on an image pickup element 9.

The light reflected by the cornea of the observer's eye E forms a Purkinje's image, and the light scattered by the pupil forms a pupil image, and the image of the eyeball shown in FIG. 3 is obtained on the image pickup element 9.

The visual axis detection circuit 14 calculates the visual axis direction of the eye E by the following method on the basis of this image of the eyeball obtained from the image pickup element 9. FIGS. 3 to 6 set and represent an XYZ coordinates system with the direction linking the observer's both eyes together defined as the X-axis direction, the direction of incidence of a ray of light leaving the center of the display surface and entering the center of the pupil P onto the pupil defined as the Z-axis direction, and a direction perpendicular to the X-axis direction and the Z-axis direction defined as the Y-axis direction.

Figure 4:
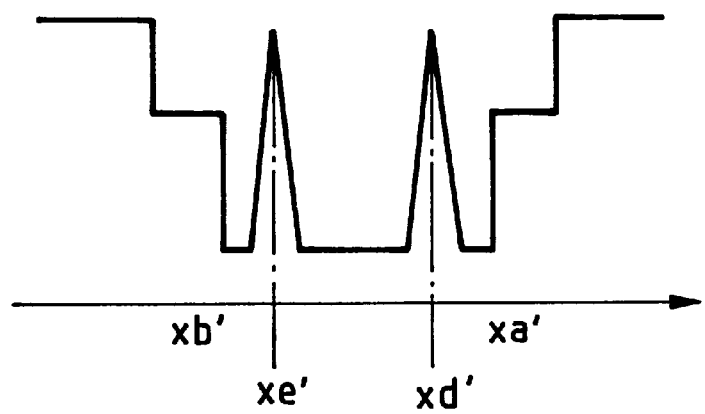
FIG. 4 is an output intensity graph obtained on the line 4—4 of FIG. 3.

FIG. 4 is an output intensity graph obtained on the line 4—4 of FIG. 3. FIGS. 5A and 5B are illustrations of the visual axis detecting method, FIG. 5A being a view in a horizontal direction (X-Z plane), and FIG. 5B being a view in a vertical direction (Y-Z plane).

The visual axis detecting method in the present embodiment uses the technique disclosed in Japanese Laid-Open Patent Application No. 3-109029.

As shown in FIGS. 5A and 5B, x'y' coordinates having the horizontal direction as x' and the vertical direction as y' are set on the image pickup element 9. The center of curvature of the cornea of the eyeball is defined as o, the center of the pupil is defined as c, the center of rotation is defined as o', and the corneal reflection images of the infrared light sources 12a and 12b are defined as d and e, respectively.

The rotation angle $\theta_x$ of the eyeball in the X-Z plane is represented as follows by the x' coordinates of the above-mentioned points on the image pickup element 9:

$$\sin(\theta_x) = [x_c' - \{(x_d' + x_e')/2 + \delta_x'\}]/(oc^*\beta) \quad (1)$$

Also, the rotation angle $\theta_y$ in the Y-Z plane is represented as follows by the y' coordinates of the above-mentioned points on the image pickup element 9:

$$\sin(\theta_y) = [y_c' - \{(y_{e,d}' + \delta_y'\}]/(oc^*\beta) \quad (2)$$

In the above expressions, $\delta_x'$ and $\delta_y'$ are correction values geometrically obtained from the installation method of the apparatus, the eyeball distance, etc., and $\beta$ is the imaging magnification of the image of the eyeball on the image pickup element 9 which is obtained from the distances of the reflection images d and e of the infrared light sources on the image pickup element 9.

The visual axis detection circuit 14 effects the calculation of expressions (1) and (2) to thereby obtain the azimuth ($\theta_x$, $\theta_y$) of the visual axis relative to the optical axis of the imaging lens 8. This azimuth also is an azimuth relative to the Z-axis. The visual axis detecting means for the right eye and the left eye detect the visual axis direction $\theta_{x,R}$, $\theta_{y,R}$ of the right eye $E^R$ and the visual axis direction $\theta_{x,L}$, $\theta_{y,L}$ of the left eye $E_L$ and input them to the control means 15.

Figure 6:
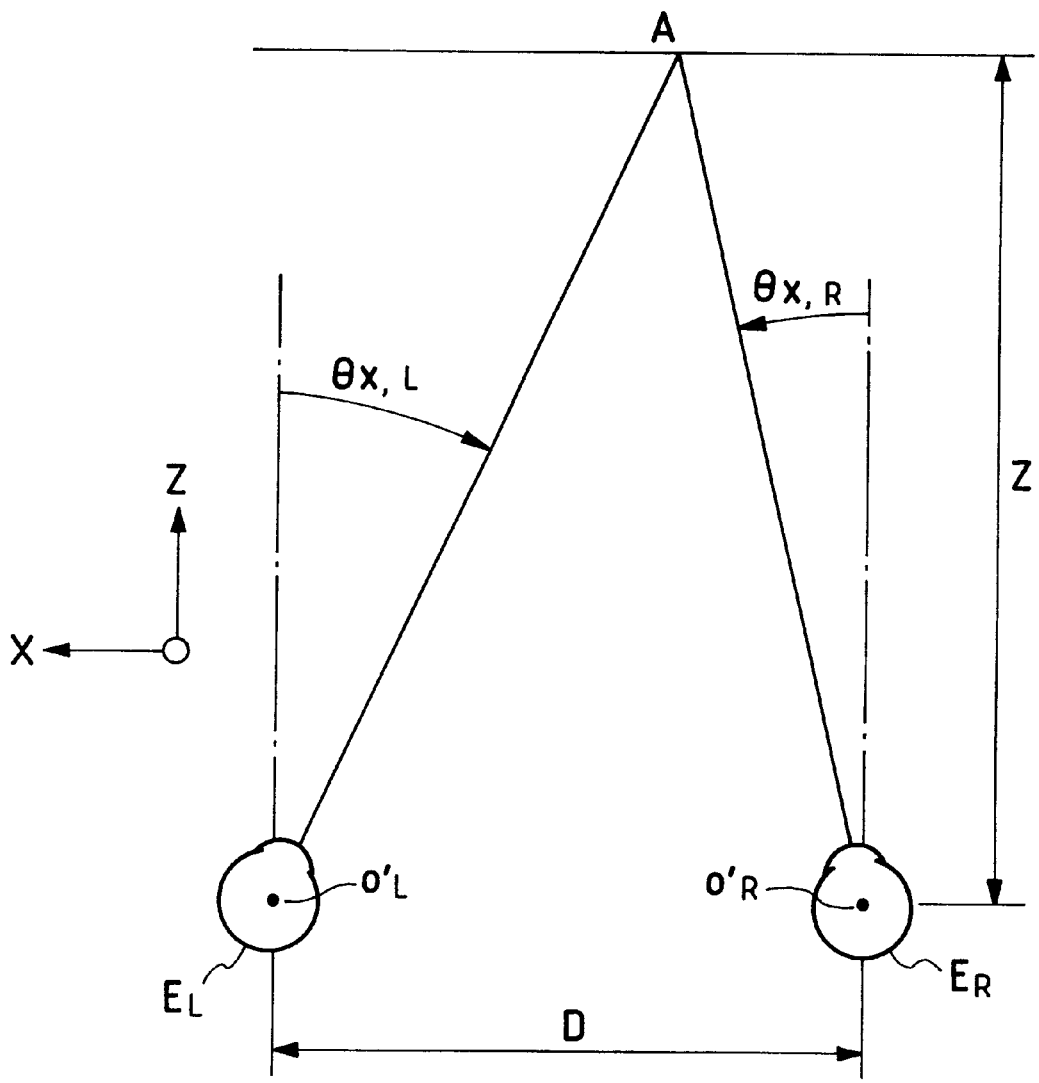
FIG. 6 is an illustration of the calculation of a gaze distance.

Next, the control means 15 calculates the distance over which the observer's eye E is gazing, by the use of the visual axis directions of the two eyes and the interval D between the two eyes. FIG. 6 is an illustration of the gaze distance calculation, and is a view in the X-Z plane. Assuming that the interval between the two eyes is D and the distance from the eyes to a gazing point A is Z, the distance Z can be found by the following calculation expression:

$$Z = D/(\tan \theta_{x,R} - \tan \theta_{x,L}) \quad (3)$$

Next, the control means 15 calculates the position of the display means 4 for forming the aforementioned image at the gaze distance Z (the position in a direction perpendicular to the display surface), drives the display means moving mechanism 17 and moves the display means 4 to that position.

By the above-described action, the present embodiment always forms a virtual image at the distance z over which the observer gazes in the exterior scene with his two eyes and therefore, even if the distance over which the observer gazes greatly fluctuates, e.g. from infinity to several tens of centimeters, the observer can always see a sharp virtual image K.

In the present embodiment, display means are provided for the two eyes, whereby stereoscopic image information can be displayed, but in some cases, display means may be provided only for one eye.

In the present embodiment, the display means 4 is moved to thereby move (the position of) the virtual image back and forth and control the formation distance thereof, but alternatively a lens or the like may be further provided between the display means 4 and the prism 10 to constitute an image observation optical system, and the lens can be moved to thereby achieve the object. As a further alternative, an optical element having an electro-optical effect, for example, $BaTiO_3$ or liquid crystal element may be inserted between the display means 4 and the prism 10, and the refractive index may be changed by electrical control to thereby substantially vary the length of the optical path.

Figure 7:
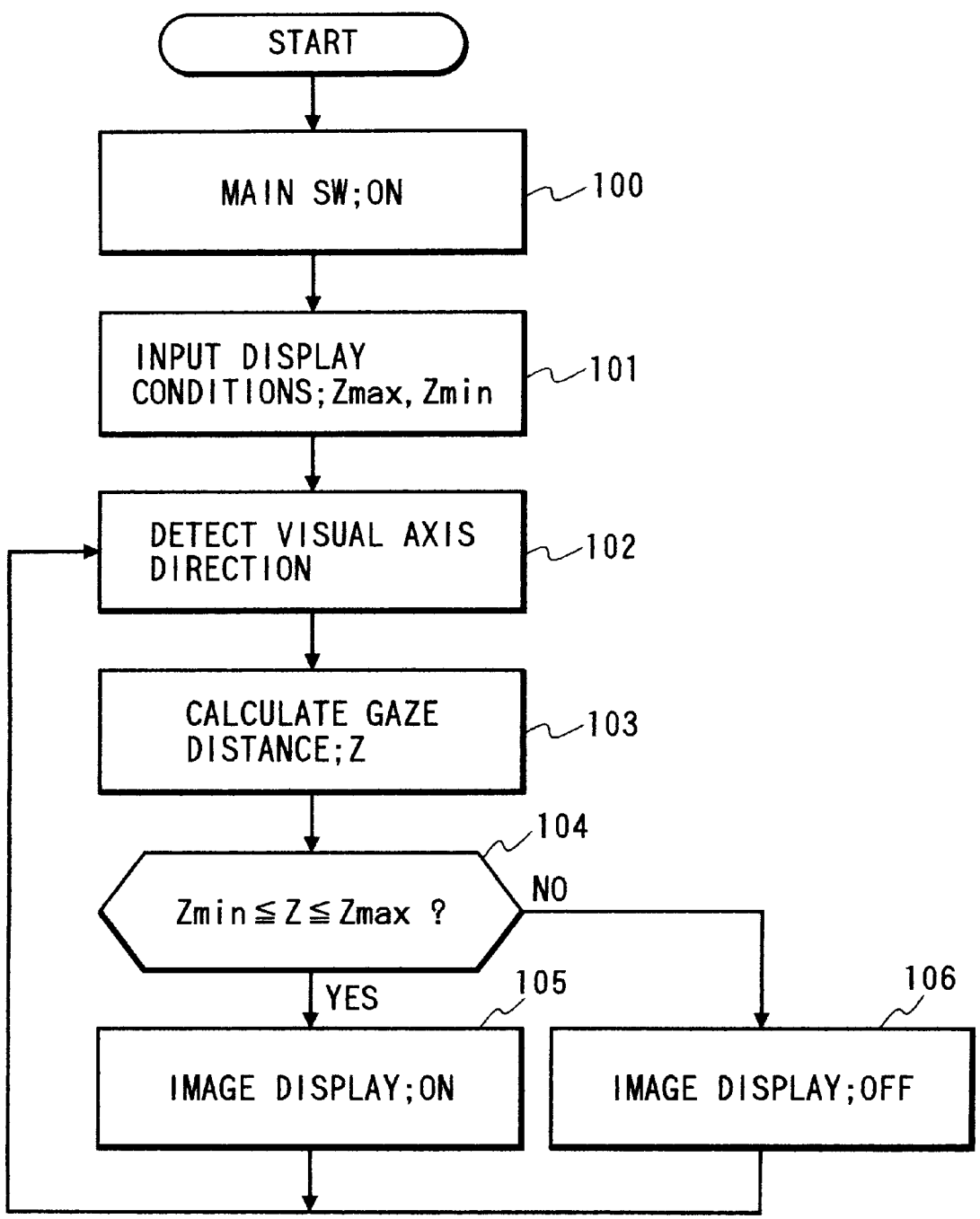
FIG. 7 is a flow chart of Embodiment 2 of the present invention.

FIG. 7 is a flow chart of the operation of Embodiment 2 of the present invention. This embodiment is an image display apparatus in which only when the observer gazes at an exterior scene in a certain distance range, the image on the display means is displayed while being superposed on the exterior scene, and during the other times, the image which becomes unnecessary is not displayed. The construction of this embodiment is almost the same as that of Embodiment 1, but differs from the latter in that the control means 15 calculates the gaze distance Z of the two eyes and only when the gaze distance Z is within a predetermined range, an image signal is delivered to the image display circuit 16 and a virtual image K is displayed in the exterior scene G.

The operation will now be described with reference to FIG. 7.

Step 100: A main switch is on.

Step 101: Image display distance ranges $Z_{min}$ and $Z_{max}$ which are display conditions are inputted.

Step 102: The visual axis directions of the two eyes are detected by the visual axis detecting means for both eyes.

Step 103: The gaze distance Z is calculated by the control means 15.

104: Whether the gaze distance Z is within the preset range $Z_{min} - Z_{max}$ is judged. If the answer is yes, shift is made to a step 105, and if the answer is no, shift is made to a step 106.

Step 105: The display means 4 is turned on to display the image, and return is made to the step 102.

Step 106: The display means 4 is turned off to stop the display of the image, and return is made to the step 102.

What has been described just above is the operation of the present embodiment. According to the present embodiment, simply by the distance range which requires image information being preset, the virtual image K of the image on the display means is displayed while being superposed on the exterior scene only when the observer gazes at the exterior scene G in the distance range, and the image is not displayed when the gaze distance is outside the distance range, and thus the object is achieved.

As a derivative example of the present embodiment, design can be made such that when the gaze distance is within a predetermined distance range, a portion of an image is displayed on the display means and when the gaze distance is outside the distance range, a portion of the image is not displayed, or that when the gaze distance is within a predetermined distance range, a certain image is displayed on the display means and when the gaze distance is outside the distance range, an image differing from the image is displayed.

Figure 8A:
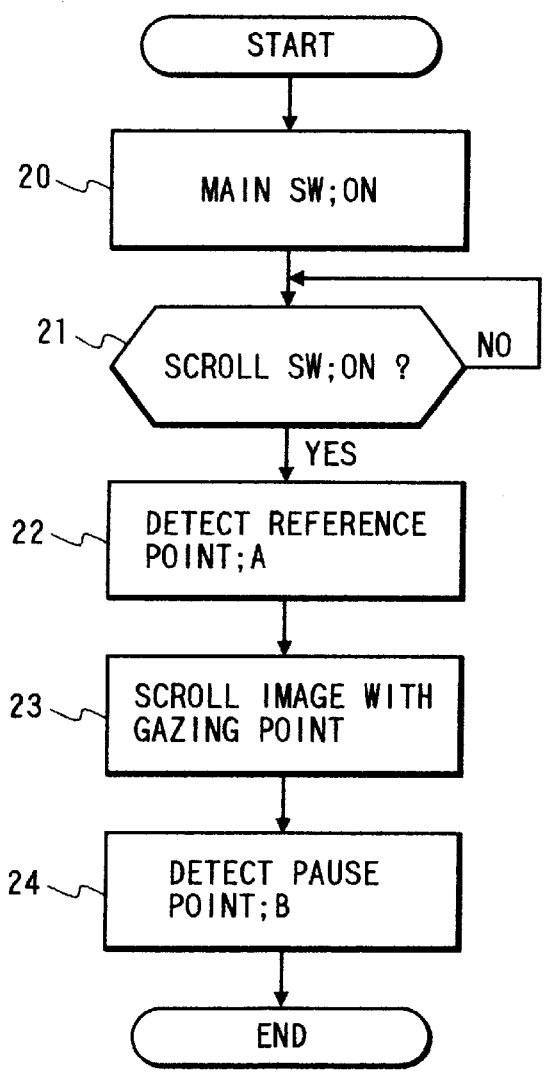
FIGS. 8A and 8B are flow charts of Embodiment 3 of the present invention.
Figure 8B:
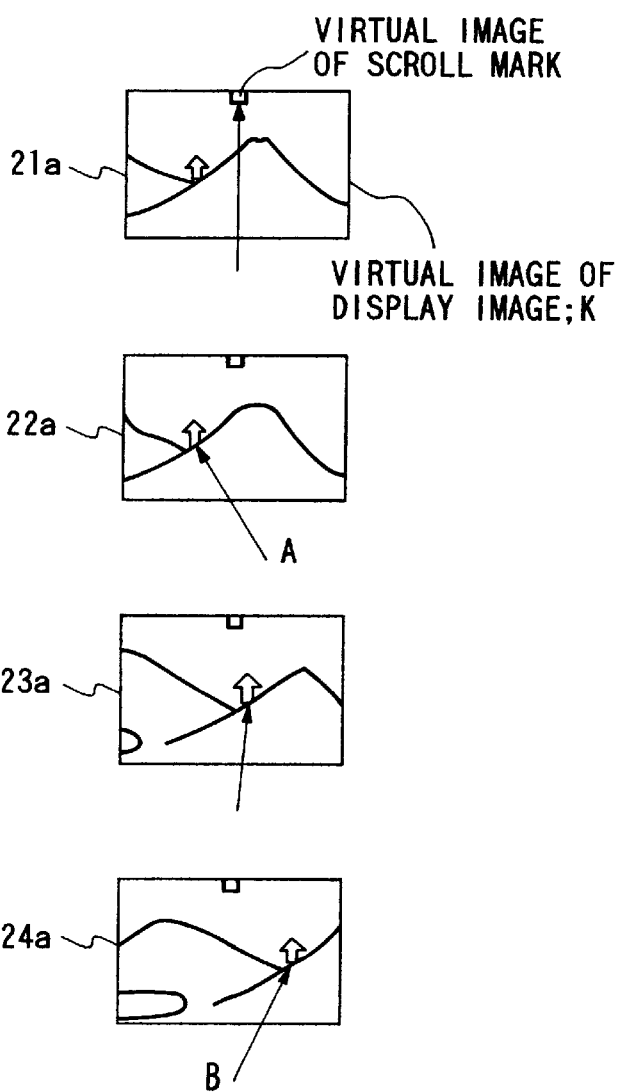

FIGS. 8A and 8B are flow charts of Embodiment 3 of the present invention. The construction of this embodiment is the same as that of Embodiment 1 but in this embodiment, the scrolling of the display image is effected by the visual axis of one E of the observer's right and left eyes.

These flow charts are flow charts showing the procedure of arbitrarily scrolling the display image by the visual axis of the observer's eyeball E. This will hereinafter be described. The figures shown at the right of the flow chart are illustrations of a virtual image K displayed forwardly of the observer at the respective steps, and the arrows therein indicate the then gazing points.

Step 20: A main switch is on. Thereby, the visual axis detecting means detects which way the visual axis of the observer's eye E is looking.

Step 21: A scroll switch is on. The changeover of the closing of the scroll switch is such that a scroll mark (a mark) is provided at a particular location in the display surface of the display means 4 and this scroll mark is displayed during ordinary image observation as well, and when the observer gazes at the virtual image of the scroll mark (hereinafter simply referred to as the scroll mark) for a predetermined time, the visual axis detecting means and the control means 15 detect that state, and the apparatus enters the scrolling operation for the display image. The specific procedure of this step is as follows:

(1) The visual axis detecting means detects a direction $\theta$ in which the observer is then gazing. The control means 15 discriminates whether the visual axis direction $\theta$ is the direction of the scroll mark. If the direction $\theta$ is the direction of the scroll mark, advance is made to (2). If the direction $\theta$ is not the direction of the scroll mark, it is judged that the observer does not desire the scrolling of the display image, and advance is not made to (2), but (1) is continued.

(2) At a point of time whereat a predetermined time has elapsed, the control means 15 detects by the visual axis detecting means the direction $\theta$ in which the observer is then gazing.

If the direction $\theta$ is also the direction of the scroll mark, the control means 15 judges that the observer has gazed at the scroll mark for a predetermined time, and advance is made to a step 22 (the scroll switch assumes its ON state).

If the direction $\theta$ is not the direction of the scroll mark, return is made to (1).

If by repeating this, the observer gazes at the scroll mark for a predetermined time, the apparatus will surely enter the scrolling operation for the display image.

Step 22: When the scroll switch assumes its ON state, the observer indicates a reference point A in the virtual image K by his visual axis. That is, the control means 15 detects by the visual axis detecting means the direction in which the visual axis gazes for a predetermined time, and stores the point in that direction as the reference point A on the display image. The procedure is as follows.

(1) A timer is started.

(2) The visual axis detecting means detects the direction $\theta$ in which the observer is then gazing, and the control means 15 stores it as $\theta_0$ in a memory.

(3) Subsequently, the control means 15 detects by the visual axis detecting means the direction $\theta$ in which the observer is then gazing, and compares it with $\theta_0$.

If the two visual axis directions are coincident with each other, advance is made to (4). If they are not coincident with each other, return is made to (1).

(4) Whether a predetermined time has elapsed is judged by the timer. If the predetermined time has not elapsed, return is made to (3). If the predetermined time has elapsed, advance is made to (5).

(5) The gazing point on the display image is determined from $\theta_0$.

The procedure is as described above. The control means 15 decides that the above-mentioned gazing point is the reference point A, and stores it, and advance is made to a step 23.

Step 23: Next, the control means 15 moves the display image with the movement of the gazing point. In parallel therewith, the control means detects a state in which the visual axis direction is fixed for a predetermined time (step 24: the detection of a pause point B), and stops the movement of the display image.

Figure 9:
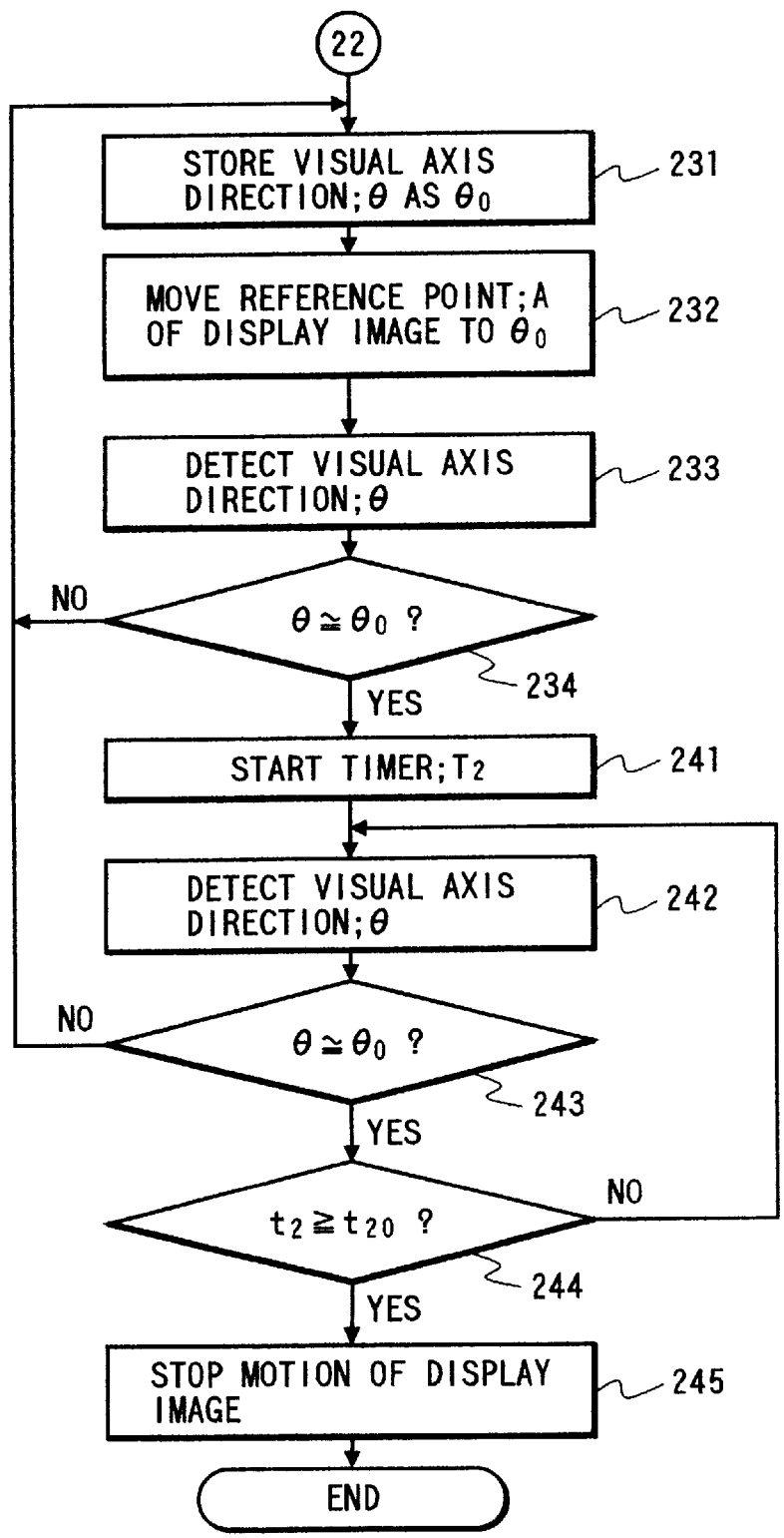
FIG. 9 shows the details of a portion of the flow chart of Embodiment 3.

FIG. 9 is a detailed flow chart of the steps 23 and 24. This will now be described. The procedure is as follows.

Step 231: The visual axis detecting means detects the direction $\theta$ in which the observer is then gazing, and the control means 15 stores it as $\theta_0$ in the memory. Step 232: The control means 15 utilizes adjacent images in the image information source S to form an image of which the reference point A has been moved in the visual axis direction $\theta_0$ by image processing, and displays the image on the display means 4.

Step 233: After a time $t_1$ has elapsed, the control means 15 detects by the visual axis detecting means the direction $\theta$ in which the observer is then gazing.

Step 234: The control means compares $\theta$ with $\theta_0$. If the two visual axis directions are coincident with each other, advance is made to a step 241. If the two visual axis directions are not coincident with each other, return is made to the step 231.

Step 241: A timer $T_2$ is started.

Step 242: The direction $\theta$ in which the observer is gazing is detected by the visual axis detecting means.

Step 243: $\theta$ is compared with $\theta_0$. If the two visual axis directions are coincident with each other, advance is made to a step 244. If the two visual axis directions are not coincident with each other, return is made to the step 231.

Step 244: Whether a time $t_2$ has passed $t_{20}$ is judged by the timer $T_2$. If the time $t_2$ has not passed $t_{20}$, return is made to the step 242. If the time $t_2$ has passed $t_{20}$, it is judged that the observer instructs to stop movement, and advance is made to a step 245.

Step 245: The motion of the display image is stopped.

As described above, in the present embodiment, after during the observation of the virtual image K of the display image, the scroll switch is on by the visual axis, the observer's visual axis is simply fixed at any position in the screen for a predetermined time, whereby thereafter the movement (scroll) of the display image can be effected in synchronism with the movement of the visual axis and the movement of the image, and simply by fixing the visual axis again for a predetermined time, the movement can be stopped. In the scrolling of the display image, no manual operation is required, and this leads to the provision of an image display apparatus which is very good in operability.

While in the present embodiment, the movement of the display image is effected in the same direction and at the same speed as the movement of the visual axis, design may be made such that the movement of the display image is effected in the opposite direction to and at the same speed as the movement of the gazing point. If such design is made, the scroll speed becomes relatively double and therefore, the image can be seen quickly.

In some cases, design may be made such that the closing operation of the scroll switch is manually changed over.

Figure 10A:
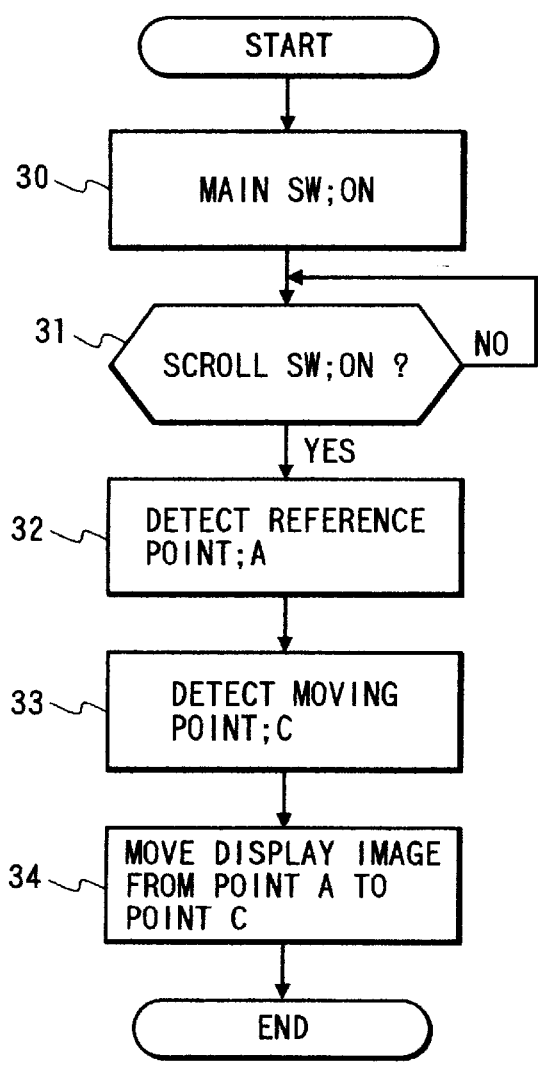
FIGS. 10A and 10B are flow charts of Embodiment 4 of the present invention.
Figure 10B:
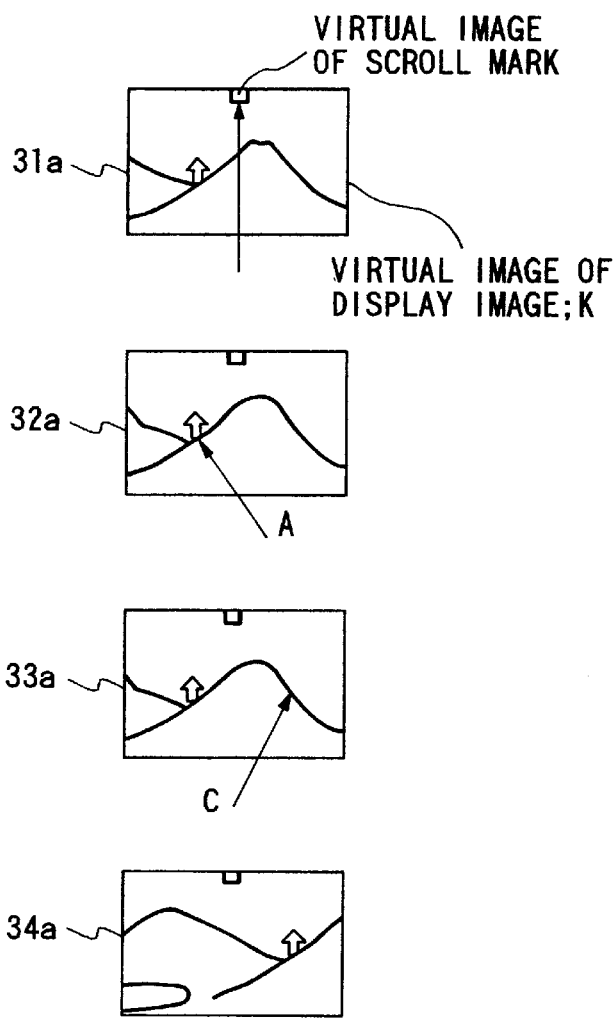

FIGS. 10A and 10B are flow charts of Embodiment 4 of the present invention. The construction of this embodiment is the same as that of Embodiment 3, but this embodiment differs in the display image scrolling method from Embodiment 3.

The flow chart will hereinafter be described. The figures shown at the right of the flow chart are illustrations of a virtual image K displayed forwardly of the observer at respective steps, and the arrows indicate the then gazing points.

The main switch is on (step 30), and during the observation of the virtual image of the display image, the scroll switch is on (step 31), whereupon the reference point A is first detected (step 32), and up to this, the present embodiment is the same as Embodiment 3.

Step 33: Subsequently, the control means 15 detects a moving point C. The method therefor is the same as the method of detecting the reference point A.

Step 34: The control means 15 utilizes adjacent images in the image information source S to form an image of which the reference point A has been moved to the moving point C, by image processing, and displays the image on the display means 4.

As described above, in the present embodiment, simply by the observer's visual axis being fixed at the scroll mark, the reference point A and the moving point, respectively, in the screen for a predetermined time during the observation of the virtual image K of the display image, there is displayed an image of which the point A has been shifted to the point C. In the movement of the display image, no manual operation is required, and this leads to the provision of an image display apparatus which is very good in operability.

In some cases, design may be made such that the ON-operation of the scroll switch is manually changed over.

As a derivative example of the present embodiment, design can also be made such that if the scroll switch is on and next, the reference point A is detected, the reference point is moved to the center of the display screen. In this case, the operations of the visual axis may be twice, and this leads to the provision of an image display apparatus which is simpler in operation.

FIGS. 11A and 11B are flow charts of Embodiment 5 of the present invention. The construction of this embodiment is the same as that of Embodiment 3, but this embodiment can set a window in the display surface of the display means and can display a plurality of images. The observer can move this window to any position in the display surface by the visual axis.

This flow chart will hereinafter be described. The figures shown at the right of the flow chart are illustrations of a virtual image K displayed forwardly of the observer at respective steps, and the arrow therein indicate the then gazing points.

Step 40: The main switch is on. Thereby the visual axis detecting means detects which way the visual axis of the observer's eye E looks.

Step 41: A window moving switch is on. The changeover of the closing of the window moving switch is such that a window moving mark (a mark) is provided at a particular location in the display surface of the display means 4 and this window moving mark is displayed during ordinary image observation as well, and when the observer gazes at the virtual image of the window moving mark (hereinafter simply referred to as the window moving mark) for a predetermined time, the visual axis detecting means and the control means 15 detect that state and the apparatus enters the moving operation of the window. The specific procedure of this is the same as that in the case of the closing of the scroll switch in Embodiment 3.

Step 42: The reference point A is detected. The method therefor is the same as that in Embodiment 3.

Step 43: Whether the reference point A is inside the window W is discriminated. If the reference point A is in the window W, advance is made to a step 44. If the reference point A is outside the window W, the reference point is a point on the image displayed on the whole display surface and therefore, the control means 15 displays to that effect and returns to the step 42.

Step 44: Next, the control means 15 moves the image of the window W (window W) with the movement of the gazing point. In parallel therewith, the control means detects a state in which the visual axis direction is fixed for a predetermined time (step 45: the detection of a pause point B), and stops the movement of the window W.

This action is the same as that in which the display image at the steps 23 and 24 of Embodiment 3 is replaced with the window W.

As described above, in the present embodiment, the window is set in the display surface and during the observation of the virtual image of the display image, the window is moved with the movement of the observer's visual axis simply by the window moving mark in the screen and the reference point A in the window being fixed for a predetermined time, and the movement of the window can be stopped simply by the visual axis being again fixed for a predetermined time. In the movement of the window, no manual operation is required, and this leads to the provision of an image display apparatus which is very good in operability.

Figure 12A:
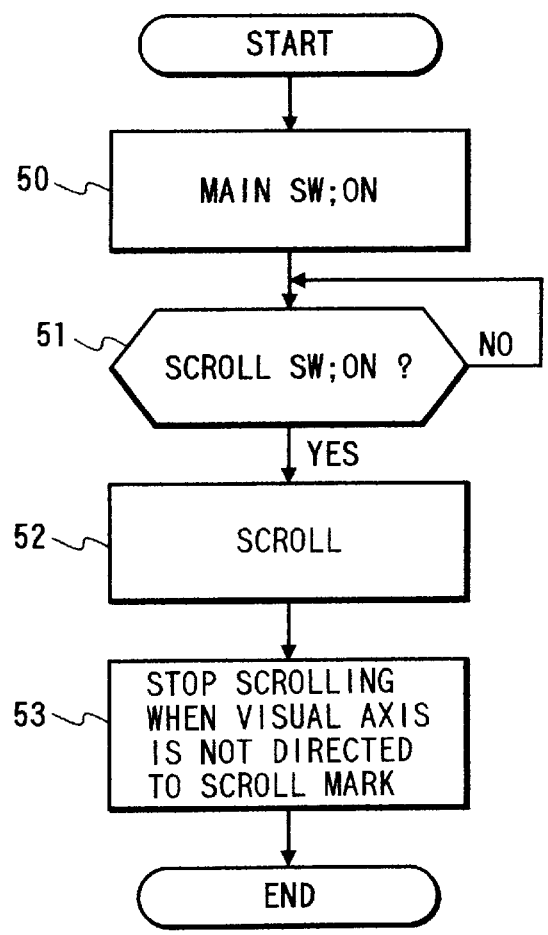
FIGS. 12A and 12B are flow charts of Embodiment 6 of the present invention.
Figure 12B:
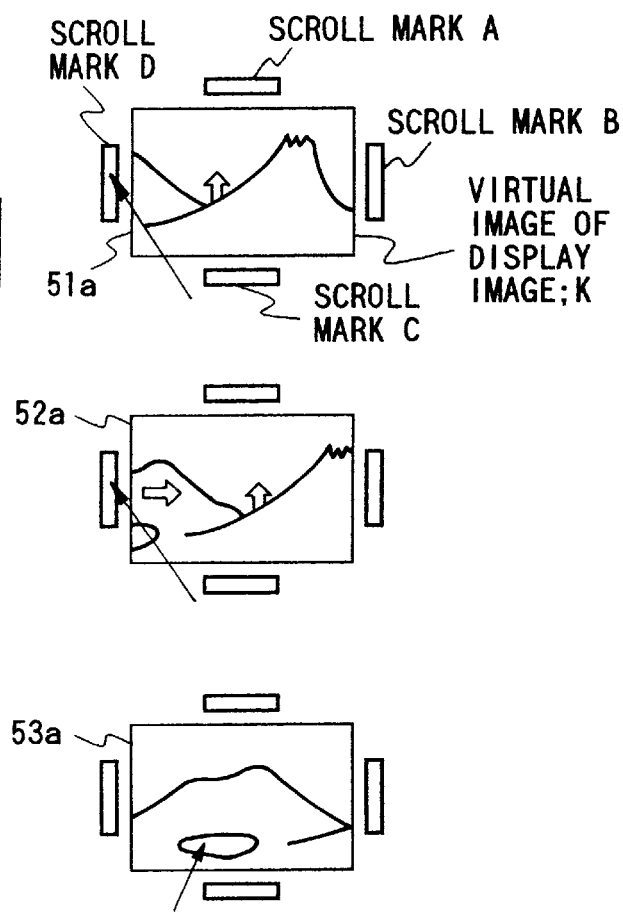

FIGS. 12A and 12B are flow charts of Embodiment 6 of the present invention. The construction of this embodiment is the same as that of Embodiment 3, but this embodiment differs in the display image scrolling method from Embodiment 3. The present embodiment is designed such that a plurality of scroll marks (marks) are provided on the display surface of the display means and if the observer gazes at one of those scroll marks for a predetermined time, scroll begins in a direction corresponding to that scroll mark, whereafter during the gazing, the scrolling continues, and the scrolling is stopped at a point of time whereat the visual axis has been deviated from the scroll mark.

This flow chart will now be described. The figures shown at the right of the flow chart are illustrations of a virtual image K displayed forwardly of the observer at respective steps, and the arrows therein indicate the then gazing points.

Step 50: The main switch is on. Thereby the visual axis detecting means detects which way the visual axis of the observer's eye E looks.

Step 51: The scroll switch is on. In the display surface of the present embodiment, scroll marks are provided in the upper and lower portions and the right and left portions as indicated by 51a in FIG. 12B. The changeover of the closing of the scroll switch is such that when the observer gazes at the virtual image of one of the scroll marks (hereinafter simply referred to as the scroll mark) for a predetermined time, the visual axis detecting means and the control means 15 detect that state, and enter the scrolling operation. The specific procedure of this is the same as that in the case where the scroll switch is on in Embodiment 3. In FIGS. 12A and 12B, it is assumed that the scroll mark D is gazed at.

Step 52: The scroll switch at the left of the display screen has been on and therefore, the portion hidden at the left of the display image automatically moves to the right. This continues as long as the visual axis gazes at the scroll mark D.

Step 53: If the visual axis direction deviates from the scroll mark, scrolling is stopped at that point of time.

As described above, in the present embodiment, simply by the observer's visual axis being fixed at one of the scroll marks in the screen for a predetermined time while the virtual image K of the display image is being observed with a plurality of scroll marks set on the display surface, the scrolling of the display image begins from the direction of that scroll mark, and simply by the visual axis being deviated from the scroll mark, the movement of the image can be stopped. In the movement of the display image, no manual operation is required, and this leads to the provision of an image display apparatus which is very splendid in operability.

In the present embodiment, still after the scroll switch has been on, whether the observer's visual axis direction θ is within $\theta_0 \pm \Delta\theta$ relative to the direction $\theta_0$ of the scroll mark is detected by the control means 15, but if design is made such that the value of $\Delta\theta$ is made somewhat great after the scroll switch has been on, scrolling will be continued even if the observer's visual axis moves a little, and the feeling of use will become better.

It is also possible to combine the construction of Embodiment 1 or 2 and the construction of one of Embodiments 3 to 6, and in that case, an image display apparatus which is still better in the feeling of use can be achieved.

In each of the above-described embodiments, the virtual image of the image displayed on the display means is formed forwardly of the observer by the image observation optical system and this virtual image is controlled, or the mark or a point in the virtual image is gazed at to thereby control the image, but even in an image display apparatus wherein a linear ray of light is caused to directly enter the observer's eye and an image is depicted on the retina and this image is visually confirmed, the image depicted on the retina by the technique of the present invention can be controlled by the gaze distance of the both eyes or the image can be controlled by gazing at the mark or a point in the image depicted on the retina.

What is claimed is:

1. An image display apparatus comprising:
   display means for displaying an image for an observer;
   an exterior scene observation optical system for observing therethrough an exterior scene forward of the observer;
   visual axis detecting means for detecting the visual axis directions of the observer's both eyes; and
   control means for detecting the gaze distance of the observer's eyes on the basis of the visual axis directions of the observer's eyes detected by said visual axis detecting means, and controlling a condition of the image on the basis of the gaze distance.

2. The image display apparatus of claim 1, wherein said control means moves a display surface of said display means or moves a portion of an image observation optical system of said display means or electrically controls a portion of said display means on the basis of the gaze distance and forms the image at the gaze distance.

3. The image display apparatus of claim 2, wherein the image is a virtual image.

4. The image display apparatus of claim 1, wherein said control means displays the image by said display means when the gaze distance is within a distance range, and does not display the image when the gaze distance is outside the distance range,
   or displays a portion of the image by said display means when the gaze distance is within a distance range, and does not display a portion of the image when the gaze distance is outside the distance range,
   or displays a first image by said display means when the gaze distance is within a distance range, and displays a second image differing from said first image when the gaze distance is outside the distance range.

5. The image display apparatus of one of claims 1 to 4, wherein said display means is provided correspondingly to both of the observer's eyes, respectively.

6. An image display apparatus comprising:
   image displaying means for displaying an image for an observers;
   visual axis detecting means for detecting the visual axis direction of an eye of the observer; and
   control means for detecting a point of the image at which the observer next gazes for a period of time or longer when it is detected through said visual axis detecting means that the observer has gazed at a certain mark in the image for a period of time or longer, and moving the image so that the point in the image moves in accordance with the visual axis.

7. An image display apparatus comprising:
   image displaying means for displaying an image for an observer;
   visual axis detecting means for detecting the visual axis direction of an eye; and
   control means for detecting a point A at which the observer gazes in said image for a period of time or longer when it is detected through said visual axis detecting means that the observer has gazed at a mark in the image for a period of time or longer, and detecting a point C at which the observer next gazes in the image for a period of time or longer, and moving the image so that point A in the image moves to point C or moving the image so that the point C moves in the image to point A.

8. An image display apparatus comprising:
   image displaying means for displaying an image for an observer;
   visual axis detecting means for detecting the visual axis direction of an eye; and
   control means for detecting a point A at which the observer gazes in a window in the image for a period of time or longer when it is detected through said visual axis detecting means that the observer has gazed at a mark in the image for a period of time or longer, and moving the image in accordance with the visual axis.

9. An image display apparatus comprising:

image displaying means for displaying an image for an observer;

visual axis detecting means for detecting the visual axis direction of an eye; and control means for moving the image at a predetermined speed in a direction corresponding to a certain mark in the image and displaying the image when it is detected through said visual axis detecting means that the observer has gazed at the mark for a period of time or longer, and stopping the movement of the image when it is detected that the observer's visual axis has deviated from the mark.

10. An image display apparatus comprising:

display means for displaying an image for an observer;

an exterior scene observation optical system for observing therethrough an exterior scene forward of the observer; and control means for detecting a distance to the exterior scene observed by the observer and for controlling a state of the image on the basis of the directed distance.

* * * * *

UNITED STATES PATENT AND TRADEMARK OFFICE
CERTIFICATE OF CORRECTION

PATENT NO.    : 6,191,892 B1
DATED         : February 20, 2001
INVENTOR(S)   : Kazuo Isaka et al.

Page 1 of 1

It is certified that error appears in the above-identified patent and that said Letters Patent is hereby corrected as shown below:

Column 3,
Line 30, "depicts" should read -- depict --;
Line 40, "respectively" should read -- respectively. --.

Column 8,
Line 36, "memory. Step 232:" should read
         -- memory.
    Step 232: --.

Column 12,
Line 30, "observers;" should read -- observer; --.

Signed and Sealed this

Twenty-ninth Day of January, 2002

Attest:

Attesting Officer

JAMES E. ROGAN
Director of the United States Patent and Trademark Office